United States Patent [19]
Nunes

[11] Patent Number: 6,109,583
[45] Date of Patent: Aug. 29, 2000

[54] TABLETOP HAVING TRANSPARENT SURFACE AND NON SCRATCH FEET

[76] Inventor: Brendon G. Nunes, 467 Westney Road, S., Unit 3, Ajax, Ontario, Canada, L1S 6V7

[21] Appl. No.: 09/084,248

[22] Filed: May 26, 1998

[51] Int. Cl.⁷ .................................................. B65D 19/00
[52] U.S. Cl. ......................................................... 248/346.11
[58] Field of Search ................... 248/346.11; 40/124.06, 40/771, 772, 776

[56] References Cited

U.S. PATENT DOCUMENTS

| | | | |
|---|---|---|---|
| 1,037,607 | 9/1912 | Floto | 40/374 |
| 1,465,244 | 8/1923 | Hager | 40/374 |
| 2,999,332 | 9/1961 | Stein | 40/615 |
| 3,188,040 | 6/1965 | Eichler | 248/346.11 |
| 3,983,277 | 9/1976 | Ackerman | 428/46 |
| 4,336,574 | 6/1982 | Goodman | 248/346.11 |
| 4,413,434 | 11/1983 | Rupert | 40/10 R |
| 5,000,413 | 3/1991 | Kawashima | 248/346.11 |
| 5,010,673 | 4/1991 | Connor | 40/661 |
| 5,018,291 | 5/1991 | Pasquale et al. | 40/642 |
| 5,022,170 | 6/1991 | House | 40/358 |
| 5,148,618 | 9/1992 | Brewster | 40/626 |
| 5,413,302 | 5/1995 | Ferster | 248/346.11 |
| 5,556,061 | 9/1996 | Dickie . | |
| 5,696,536 | 12/1997 | Murphy | 345/163 |
| 5,727,766 | 3/1998 | Mayo | 248/346.01 |
| 5,751,667 | 5/1998 | Nunes . | |
| 5,791,620 | 8/1998 | Carcich | 248/346.01 |

FOREIGN PATENT DOCUMENTS

| | | | |
|---|---|---|---|
| 1569816 | 6/1969 | France | 248/346.11 |
| 362284 | 12/1931 | United Kingdom | 248/346.11 |
| 623618 | 5/1949 | United Kingdom | 248/346.11 |

*Primary Examiner*—Ramon O. Ramirez
*Attorney, Agent, or Firm*—Nixon & Vanderhye P.C.

[57] ABSTRACT

A tabletop item, such as a coaster, trivet, or ashtray, is inexpensively constructed yet can have significant aesthetic appeal. The item includes a first substantially transparent component having an inner surface and an outer surface, a second component comprising a piece of sheet material (such as paper) having first and second faces and multicolor indicia on at least the first face, and a third component comprising a base having an inner surface and an outer surface with a plurality of feet-receiving openings. A plurality of feet of non-scratch material extend through the feet receiving openings of the third component exteriorly thereof to support the tabletop item on a surface substantially without scratching the surface. The components are held together so that second component is disposed (e.g. sandwiched) between the inner surface of the first and third components. Preferably the openings are counterbored so that the heads of the feet are substantially flush with the inner surface of the third component. The components may be held together by frictional fit, adhesive, sonic welding, or the like. The paper may be easily printed with multi-color designs using a conventional computer controlled printer.

18 Claims, 3 Drawing Sheets

U.S. Patent   Aug. 29, 2000   Sheet 3 of 3   6,109,583 ial function (such as preventing condensation from a glass placed thereon affecting the underlying table or like surface). While there are a number of different techniques for manufacturing such tabletop items, they typically involve producing a laminate, and providing a non-scratch function by adhering, with adhesive, individual feet, or an entire sheet, of non-scratch material, such as soft plastic or synthetic rubber. For example, feet or sheets having an adhesive on one surface thereof, covered by a release sheet, can be utilized, and after the release sheet is removed the adhesive can be pushed into contact with the bottom of the tabletop item.

TABLETOP HAVING TRANSPARENT SURFACE AND NON SCRATCH FEET

BACKGROUND AND SUMMARY OF THE INVENTION

It is highly desirable to be able to make coasters, trivets, ashtrays, or like tabletop items, so that there is an interesting and/or aesthetic design that is visible, so that the tabletop item can perform an aesthetic or conversation piece function in addition to its primary function (such as preventing condensation from a glass placed thereon affecting the underlying table or like surface). While there are a number of different techniques for manufacturing such tabletop items, they typically involve producing a laminate, and providing a non-scratch function by adhering, with adhesive, individual feet, or an entire sheet, of non-scratch material, such as soft plastic or synthetic rubber. For example, feet or sheets having an adhesive on one surface thereof, covered by a release sheet, can be utilized, and after the release sheet is removed the adhesive can be pushed into contact with the bottom of the tabletop item.

While the tabletop items described above are successful in providing multiple functions, it is desirable to be able to reduce the cost of manufacture thereof, while at the same time providing greater versatility. According to the present invention a tabletop item, and a method of manufacture thereof, are provided which achieve these goals. That is, according to the present invention a tabletop item can be manufactured in a more cost effective manner than by utilizing prior art techniques, while obtaining the same or higher quality. Also, the tabletop items according to the invention may be constructed with almost any design component without requiring large runs of designs, and may even be provided so that they may be disassembled and reassembled with a different design.

According to one aspect of the present invention a tabletop item is provided comprising the following components: A first, substantially transparent, component having an inner surface, and an outer surface. A second component comprising a piece of sheet material having first and second faces and multicolor indicia on at least the first face, the sheet first face having dimensions substantially equal to or less than the first component inner surface. A third component comprising a base having an inner surface and an outer surface, the outer surface having a plurality of feet-receiving openings therein. The components held together so that the second component is disposed (e.g. sandwiched) between the inner surfaces of the first and third components. And a plurality of feet of non-scratch material extending through the feet receiving openings of the third component exteriorly thereof to support the tabletop item on a surface substantially without scratching the surface.

Where the tabletop item is a coaster, the outer surface of the first component comprises a substantially flat surface having an area of between about 25–150 square centimeters, and preferably the thickness of the item is about 1.5 cm less or less. Typically, the first component is of a hard plastic, such as clear acrylic or clear lexan, although less expensive clear plastics also may be used, such as crystal styrene. There may be a space (e.g. 0.5–2.5 cm) between the second component and the first component, and a transparent element (and/or objects or liquid) may be disposed between the first and second components.

The third component may also be hard plastic, but typically can be of a lower quality plastic than the first component since it does not engage a drinking glass, hot dish, ashes, or other accessories that may be engaged by the outer surface of the first component. The third component can be either transparent or opaque, and of almost any suitable plastic, or non-plastic, materials.

The first and third components may be releasably held together by a friction fit, one nesting within the other. For example, the first component may have a peripheral wall extending outwardly from the inner surface, and the third component may engage that peripheral wall, frictionally, yet be able to be separated into components at the inner portion of the wall. Alternatively, the components may be substantially permanently attached together, such as by sonic welding the first and third components together, or by providing an adhesive between cooperating surfaces thereof.

The second component may comprise a piece of cellulose material (paper or paperboard) having a thickness of about 0.25 cm or less. Both the first and second faces of the second component may have multi-color indicia thereon, so that either the second face is seen when viewed through the transparent third component, or so that the faces are reversible by disassembling the first and third components.

The non-scratch feet typically comprise a shank portion and an enlarged head portion at one end of the shank portion; and the third component feet receiving openings extend through the third component, the opening large enough for a shank of a non-scratch foot to pass therethrough, but small enough so that a head of a the non-scratch foot cannot pass therethrough, the heads disposed between the inner surface of the first component and the outer surface of the third component. Preferably the feet-receiving openings in the third component are counterbored at the inner surface of the third component so that a head of a non-scratch foot is received by the counterbore and is substantially flush with the inner surface of the third component. The feet are preferably made of a soft PVC or other soft plastic, synthetic rubber, natural rubber, or the like.

Rather than the outer surface of the first component being flat, it may have surface manifestations so that some other structure aside from a trivet or a coaster is provided thereby, for example upstanding portions to hold ashes therewithin, or to support a cigarette, or to support other implements (such as knives or other utensils) in a readily accessible manner. Where the tabletop item comprises an ashtray or trivet, of course at least the plastic forming the first component is of heat-resistant and burn-resistant material, so that the item may properly perform its function.

According to another aspect of the present invention a method of making a tabletop item is provided comprising or consisting essentially of: (a) Placing the first face of the second component into substantially parallel juxtaposition with (e.g. spaced from or in contact with) the inner surface of the first component. (b) Passing the feet through the feet-receiving openings so that portions of the feet extend outwardly from the outer surface of the third component. And (c) assembling the third component to the first component so that the second component is disposed (e.g. sandwiched) between the inner surfaces of the first and third components and the feet allow the tabletop item to be placed on a surface substantially without scratching the surface.

(b) May be practiced by placing the feet into the openings so that the heads of the feet are disposed in the counterbores, and essentially do not protrude above the inner surface of the third component. (c) May be practiced by pushing the third component into contact with the peripheral lip so as to be frictionally held thereby.

Procedures (a) through (e) may be practiced to produce an ashtray, a coaster, a trivet, or the like. The second component may comprise paper and there may be the further step of printing at least the first face (and perhaps both faces) of the second component with multicolor indicia using a conventional computer controlled printer (such as a typical office printer controlled by a PC or the like). Also, the tabletop item may be disassembled, and the face of the second component in juxtaposition (e.g. contact) with the inner surface of the first component switched, or a new second component inserted. Also, under some circumstances more than the components described above may be provided in the tabletop item, such as additional sheets of material disposed between the first and third components, a material providing a spring-like action, a liquid with one or more bubbles that is visible through the first component, etc.

It is a primary object of the present invention to provide a tabletop item that provides more than one function, yet is relatively inexpensive, and easy, to produce, and is versatile. This and other objects of the invention will become clear from an inspection of the detailed description of the invention and from the appended claims.

DETAILED DESCRIPTION OF THE DRAWINGS

Figure 1:
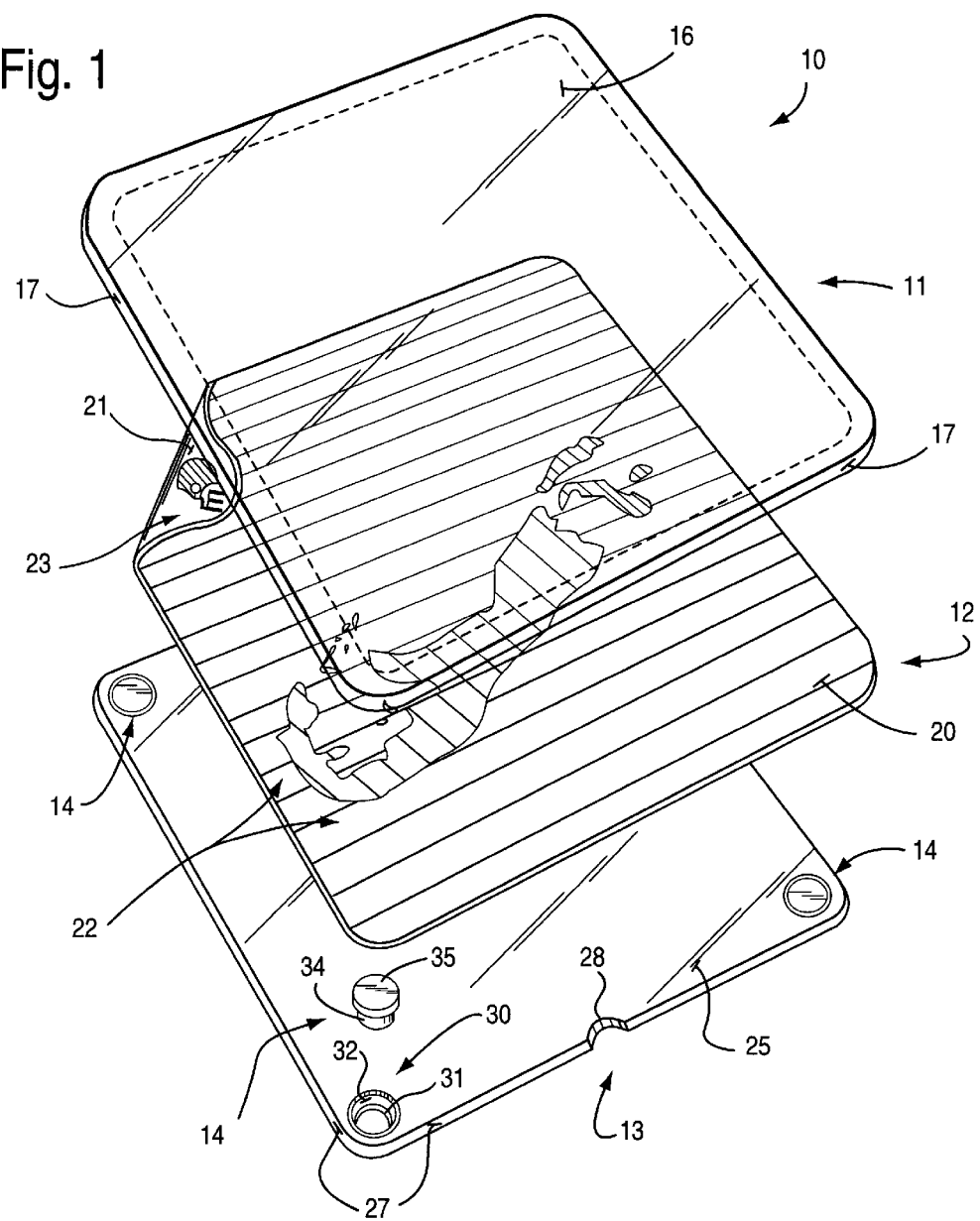
FIG. 1 is a top perspective exploded view of an exemplary tabletop item, serving as a coaster, according to the present invention.
Figure 2:
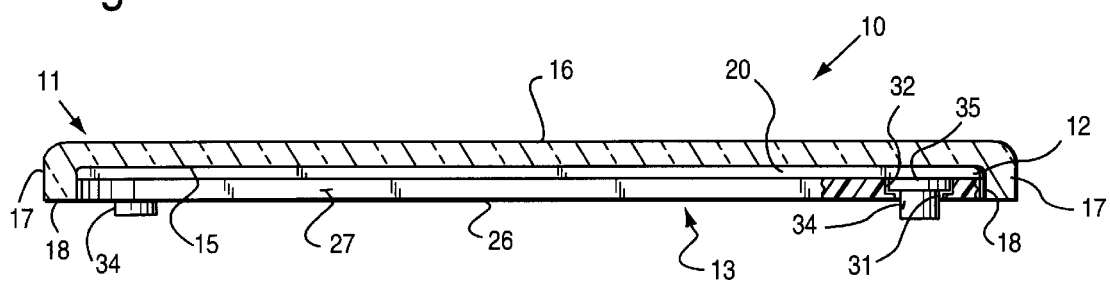
FIG. 2 is side view, partly in cross section and partly in elevation, of the coaster of FIG. 1 when assembled.

A tabletop item according to the present invention which is specifically designed to be used as a coaster is illustrated generally by reference numeral 10 in FIGS. 1 and 2. The major components of the tabletop item 10 comprise a first substantially transparent component 11, a second component 12, a third component 13, and a plurality of feet 14 of non-scratch material.

The first component 10 preferably is a molded integral piece of plastic, such as a hard plastic-like clear acrylic, clear lexan, or crystal styrene. It includes an inner surface 15 (see FIG. 2) and an outer surface 16. The outer surface 16 is of such a size that a hot or cold drinking cup or glass can be supported thereby without damage to it or any of the other components of the item 10. The plastic forming component 11 preferably is a hard plastic.

In the embodiment illustrated in FIGS. 1 and 2, the outer surface 16 is substantially flat, and has an area of about 80–100 square centimeters. When functioning as a coaster, item 10 typically has an area of between about 25–150 square centimeters, and may be of any shape, such as the square shape (with rounded corners) illustrated in FIG. 1, of another polygon shape (e.g. rectangle, octagon, etc.), circular, or like other common objects or stylization of objects (such as an apple, heart, football helmet, etc.).

Also, in the preferred embodiment illustrated in FIGS. 1 and 2, the first component 11 has a lip 17 extending outwardly from the inner surface 15 substantially around the circumference of the surfaces 15, 16. The lip 17 is dimensioned outwardly from the surface 15 large enough to accommodate the components 12, 13. While a wide variety of dimensions may be provided, typically the distance between the inner surface 15 and the very bottom surface 18 of the lip 17 is about 0.2–0.5 cm, and the distance from the surface 16 to the surface 18 is typically between about 0.4–1.0 cm, e.g. about 0.6 cm.

The second component 12 comprises a piece of sheet material having a first face 20 and a second face 21 with multi-colored indicia (illustrated schematically at 22 in FIG. 1) on at least first face 20. First face 20 preferably has dimensions substantially equal to or less than the first component 11 inner surface 15, and preferably is essentially the same shape. For the embodiment illustrated in FIGS. 1 and 2, the second component 12 is also substantially a square with rounded corners just like the surface 15.

The second component 12 preferably is a piece of cellulosic material, such as paper or paperboard, and typically has a thickness of about 0.25 cm or less, and may have the thickness of a typical sheet of bond paper (e.g. about 0.1 cm). Any indicia desired may be applied to the face 20 and/or the face 21. This indicia may include any type of art work, vacation spots, sports teams' logos or designs, photographs of famous people or family members, etc. Under some circumstances, where the item 10 is designed to have the illustration provided by the indicia 22 changed, indicia may be provided on both of the faces 20 and 21. This is illustrated schematically in FIG. 1 by the indicia 23 on the upturned corner of the component 12 which illustrates the face 21.

The third component 13 comprises a base having an inner surface 25 (FIG. 5), and an outer surface 26 (FIG. 2). The material of the component 13 is preferably a hard, rigid material, preferably a hard plastic and it may be the same plastic as the component 11, or a less expensive plastic, and it may be either opaque or transparent.

The components 11, 13 are held together with the component 12 disposed (e.g. sandwiched) between them with—in the embodiment illustrated in FIGS. 1 and 2—the surfaces 15, 20 engaging and the surfaces 21, 25 engaging. Actual contact between the surfaces (e.g. 15, 20) is not necessary in some cases—there merely should be some sort of substantially parallel juxtaposition between them.

The components 11, 13 may be held together in a releasable manner, or substantially permanently, utilizing any suitable conventional technique for that purpose. For example, there may be interfitting castellations on the components, and they may be held together by adhesive or sonic welding, or there may be surfaces thereof which frictionally engage each other. In the embodiment illustrated in FIGS. 1 and 2, the third component 25 is dimensioned so that the peripheral surface 27 thereof has essentially the same (or slightly less) dimensions as the inner surface of the lip 17 so that—as illustrated in FIG. 2—the components 11, 13 are held together by a friction fit between the inner surface of the lip 17 and the peripheral 27 of the third component 13. The frictional fit is preferably tight and requires the use of a prying tool inserted between the lip 17 and the surface 27 in order to dislodge the component 13 from the component 11. A cutout 28 (see FIG. 1) may be provided in the surface 27 to facilitate insertion of the prying tool.

The third component 13 also has a plurality of feet-receiving openings in at least the outer surface 26 thereof. Preferably the openings are through-extending openings, such as illustrated at 30 in FIG. 1, and also seen at the cross-sectional portion of the component 13 in FIG. 2. Through-extending opening 30 is provided so that a foot 14 may be pass from the surface 25 through and outwardly from the surface 26 to provide a non-scratch and preferably non-skid support for the item 10.

In the preferred embodiment illustrated in FIGS. 1 and 2, the opening 30 includes a completely through-extending portion 31 and a counterbore 32. The counterbore 32 is designed to allow the foot 14 to fit substantially completely within the opening 30 so that the foot 14 does not protrude a significant distance above the inner surface 25 of the component 13.

Preferably the feet 12 are of soft plastic, such as soft PVC, synthetic rubber, natural rubber, or like material that preferably is both non-scratching and non-marking and allows the item 10 to be maintained in place on a surface on which it is placed. Preferably each of the feet 14 has a shank portion 34 and a head portion 35, the shank portion 34 being long enough to extend outwardly through the outer surface 26 of the third component 13 when the head portion 35 is substantially completely received within the counterbore 32 (as seen in both FIGS. 1 and 2). That is, the head 35 of each of the feet 14 is preferably substantially flush with the inner surface 25 of the third component 13.

Note that the opening 31 is large enough for the shank 34 of a foot 14 to pass therethrough, but not large enough for the head 35 to pass therethrough, and that the counterbore portion 32 of the opening 30 has dimensions slightly greater than the dimensions of the head 35. When the components 11 through 13, are assembled together with the feet 14, as illustrated in FIG. 2, the feet 14 cannot move since they abut the component 12 which in turn abuts the inner surface 15 of the component 11, in a tight fitting manner.

The feet 14 may be of any shape or cross section, the circular cross section embodiment illustrated being preferred for ease of manufacture, but any type of polygonal or like other cross sections being possible. While the dimensions of the feet 14 may vary depending upon the size and use of the item 10, and how many feet are provided (in the embodiment illustrated in FIGS. 1 and 2 there would be four feet, one in each of the corners of the substantially square item 10). In the embodiment illustrated each foot 14 has a total length (from top of the head 35 to the bottom of the shank 34) of about 0.4 cm, where the thickness of the component 13 (which is a substantially a flat, planar component in the embodiment illustrated) is about 0.25 cm.

The provision of the feet 14 provides a significant cost advantage compared to conventional coaster constructions which utilize the piece of foam having adhesive on the surface thereof which is glued to the bottom of the coaster (e.g. the surface corresponding to the surface 26 for the item 10 according to the invention), and which also allows replacement of the feet 14 if they wear out, or if it is desired to raise the surface 26 a larger distance above the surface on which it might be disposed (such as if the item 10 is to serve as a trivet).

In the production of the item 10, typically the components 11, 13 will be molded of plastic, such as by injection molding, blow molding or the like. The second component 12 is preferably made utilizing a conventional computer controlled printer. Small runs may be made in a cost effective manner, and the components 12 are typically cut from 8½×11 or other standard sized sheets which are printed.

In the assembly the item 10, the first face 20 of the second component 12 is placed in substantially parallel juxtaposition with (e.g. into contact with) the inner surface 15 of the first component 11, the four feet (in the embodiment illustrated in FIGS. 1 and 2) 14 are inserted into the openings 30 so that the shanks 34 extend outwardly of the surface 26 and the heads 35 are substantially completely received within the counterbores 32; the third component 13—with the orientation illustrated in FIG. 1—is pushed upwardly into contact with the component 12, which in turn is in contact with the surface 11, so that the periphery 27 frictionally engages the inner surface of the lip 17; and an extra measure of force is added to insure that the frictional engagement is complete, and so that substantially no part of the component 13 extends outwardly of the lip 17, but rather only the shank portions 34 of the feet 14 extend downwardly from the surface 26. The item 10 is then readily used as a coaster, by placing the feet shanks 34 into contact with a tabletop, desktop, or the like, and a hot or cold drink cup or glass may be placed on the surface 16 while the coaster 10 protects the tabletop or desktop.

The components 11, 13 may be disassembled by inserting a prying tool in 28, the component 12 reversed so that face 21 contacts surface 15, and the components 11, 13 reassembled; or a new component 12 may be inserted.

While the item 10 illustrated in FIGS. 1 and 2 has been described as a coaster, it is to be understood that a wide variety of other tabletop items may be provided. For example, just by making the dimensions larger, and insuring that the plastic material that at least the component 11 is made of is heat resistant, perhaps making the feet 14 larger in cross section, and having the shanks 34 extend a larger distance outwardly from the surface 26, the item 10 can function as a trivet. A wide variety of other items can also be made, such as ashtrays, utensil or other implement holders, or the like. Virtually any item that is designed to be placed on a tabletop—if protection of the tabletop is desired—may be manufactured according to the invention.

Figure 3:
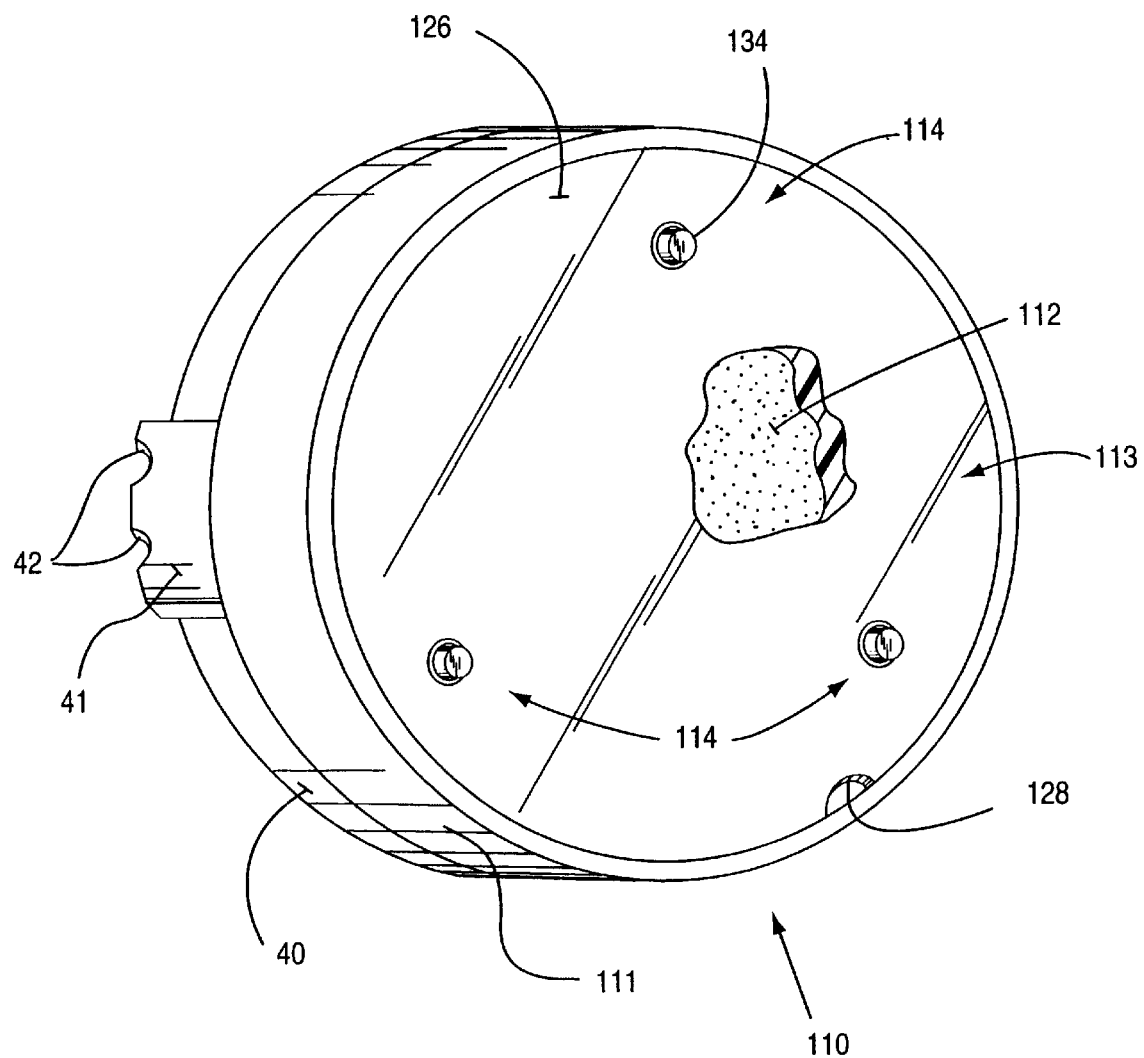
FIG. 3 is a bottom perspective view of another embodiment of a tabletop item, in this case an ashtray or utensil holder, according to the present invention.

FIG. 3 schematically illustrates another embodiment showing, in some measure, the variety of applications that the items 10 according to the invention may take. FIG. 3 shows an item 110 (FIG. 3 components comparable to those in FIG. 1 and 2 embodiment are shown by the same reference only preceded by a "1") having a first component 111, a second component 112 (seen as the cutout portion in FIG. 3), and a third component 113 having an outer surface 126. In this embodiment the components 111–113 are substantially circular in plan, and three feet 114 have the shank portions 134 extending outwardly from the surface 126.

In the FIG. 3 embodiment instead of the top surface of the component 111 being substantially flat throughout (as is the surface 16 in FIGS. 1 and 2), an upstanding peripheral ring 40 is provided, which has one or more object holding structures 41 extending upwardly therefrom. For example, the structures 41 may have contour portions 42 designed to hold a cigarette, a utensil (such as a knife or fork used for carving, or a whisk or other stirrer used in food preparation), so that the item 110 serves as an ashtray, kitchen item, or the like.

While the ring 40 and support or supports 41 may be integral with the component 111 and made of the same material (e.g. clear acrylic), they also may be made of different materials, including opaque materials, that are adhesively connected or sonically welded to the first component 111 (and the component 11 top surface may be substantially flat).

Also, under some circumstances more than the components 11–13, 111–113, described above may be provided in the tabletop item 10, 110; such as additional sheets of material (like 12, 112) disposed between the first and third components (11, 111 and 13, 113), a material providing a spring-like action, a liquid with one or more bubbles that is visible through the first component 11, 111, etc. One such embodiment is illustrated in FIGS. 4–6.

Figure 4:
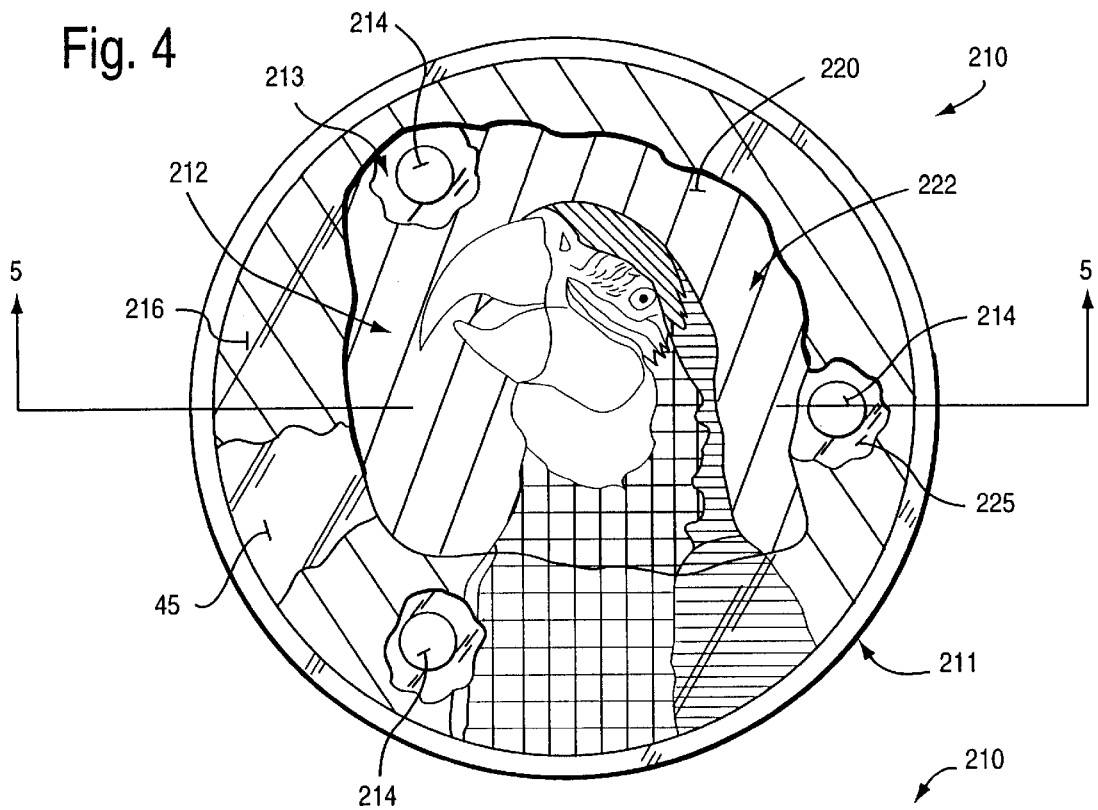
FIG. 4 is a top view, with portions cut away for clarity of illustration, of a third embodiment of a tabletop item according to the present invention.
Figure 5:
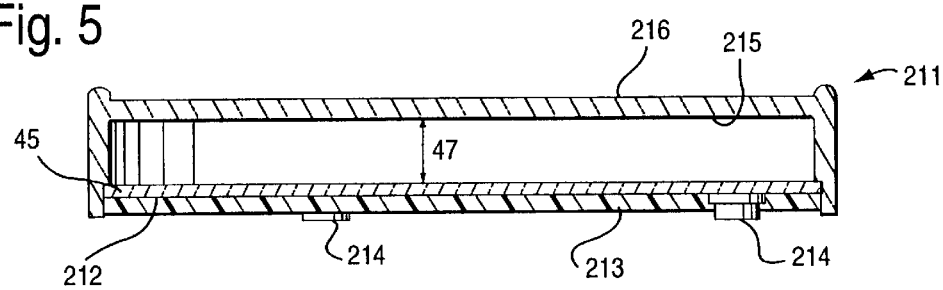
FIG. 5 is a primarily cross-sectional view, with only one foot shown in elevation, of the embodiment of FIG. 4 taken along lines 5—5 thereof.
Figure 6:
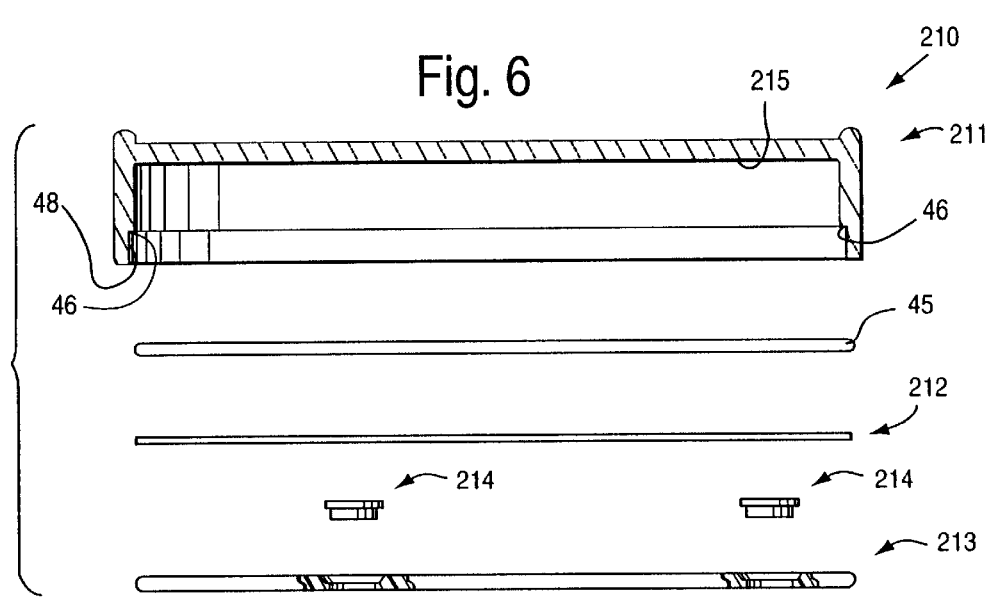
FIG. 6 is an exploded side view, with the first component shown in cross-section and the components in elevation, of the embodiment of FIGS. 4 and 5.

In the FIGS. 4–6 embodiment components comparable to those in the FIG. 1 embodiment are shown by the same reference numeral only preceded by a "2". While many of the components are substantially identical, the first component 211 is designed slightly differently, another, transparent, element 45 is provided, which mates with a receiving surface 46 in the first component 211, and when the components are assembled there is a space 47 (see FIG. 5) between the element 45 and the inner surface 215. The space 47 may be, for example, about 0.5–2.5 cm (e.g. about 1 cm). In the space 47 may be disposed, in some circumstances, a transparent liquid or gel, or novelty objects (such as disclosed in U.S. Pat. No. 5,751,667, the disclosure of which is hereby incorporated by reference herein).

The transparent element 45 may be a piece of transparent plastic, or glass, and the peripheral surface thereof may make a friction fit with the inner surface 48 adjacent the shoulder 46 of the first component 211. Also the peripheral surface of the third component 213 may make a frictional fit with the surface 48. Alternatively the various surfaces may be attached together by ultrasonic welding, adhesive, or the like as earlier described with respect to the FIGS. 1 and 2 embodiment. Of course the indicia 222 on the cellulose sheet (second component) 212 may be any desired indicia, and the sheet 212 may be reversible (that is have indicia on both faces thereof) if desired as also described above with respect to the FIGS. 1 and 2 embodiments.

It will be thus be seen that according to the present invention a tabletop item is provided which not only has the normal functions of acting as a coaster, trivet, ashtray, or the like, but also has an aesthetic or conversation generating or novelty function which is provided by the indicia 22, 23, which is visible from the exterior of the item 10, 110, 210. The item 10, 110, 210 according to the invention can also be produced in a simple and cost effective manner.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A tabletop item comprising:
   a first, substantially transparent, component having an inner surface, and an outer surface;
   a second component comprising a piece of sheet material having first and second faces and multicolor indicia on at least said first face, said sheet first face having dimensions substantially equal to or less than said first component inner surface;
   a third component comprising a base having an inner surface and an outer surface, said outer surface having a plurality of feet-receiving openings therein;
   said components held together so that said second component is disposed between said inner surfaces of said first and third components; and
   a plurality of feet of non-scratch material extending through said feet receiving openings of said third component exteriorly thereof to support said tabletop item on a surface substantially without scratching the surface, wherein said non-scratch feet comprise a shank portion and an enlarged head portion at one end of said shank portion; and wherein said third component feet receiving openings extend through said third component, each said opening large enough for a said shank of a non-scratch foot to pass therethrough, but small enough so that a head of a said non-scratch foot cannot pass therethrough, said heads disposed between said inner surface of said first component and said outer surface of said third component.

2. A tabletop item as recited in claim 1 wherein said tabletop item is a coaster, and wherein said outer surface of said first component comprises a substantially flat surface having an area of between about 25–150 square centimeters.

3. A tabletop item as recited in claim 2 wherein said first and third components are releasably held together by a friction fit.

4. A tabletop item as recited in claim 2 wherein said first component is of hard plastic, and wherein said second component is sandwiched between said inner surfaces of said first and third components.

5. A tabletop item as recited in claim 4 wherein said assembled first, second and third components have a combined thickness of less than 1.5 cm.

6. A tabletop item as recited in claim 4 wherein said third component is of hard plastic.

7. A tabletop item as recited in claim 1 further comprising a space between said second component and said first component inner surface, and a transparent element covering said second component and disposed in said space.

8. A tabletop item as recited in claim 1 wherein said feet-receiving openings in said third component are counterbored at said inner surface of said third component so that a head of a said non-scratch foot is received by said counterbore and is substantially flush with said inner surface of said third component.

9. A tabletop item as recited in claim 8 wherein said feet are made of soft PVC or other soft plastic, synthetic rubber, or natural rubber.

10. A tabletop item as recited in claim 1 wherein said second component comprises a piece of cellulosic material having a thickness of about 0.25 cm or less.

11. A tabletop item as recited in claim 10 wherein both said first and second faces of said second component have multi-color indicia thereon.

12. A tabletop item as recited in claim 1 wherein said tabletop item comprises an ashtray having a contoured cigarette holding portion.

13. A method of making a tabletop item from a first substantially transparent component having an inner surface and an outer surface, a second component comprising a piece of sheet material having first and second faces and multi-color indicia on at least the first face, and a third component comprising a base having an inner surface and an outer surface and a plurality of feet-receiving openings passing from the inner surface to the outer surface, and a plurality of feet of non-scratch material, and wherein said non-scratch feet comprise a shank portion and an enlarged head portion at one end of the shank portion; and wherein the feet receiving openings are each large enough for a shank of a non-scratch foot to pass therethrough, but small enough so that a head of a non-scratch foot cannot pass therethrough; said method comprising:

(a) placing the first face of the second component into substantially parallel juxtaposition with the inner surface of the first component;

(b) passing the feet through the feet-receiving openings so that portions of the feet extend outwardly from the outer surface of the third component but so that the heads of the feet do not pass through the openings; and (c) assembling the third component to the first component so that the second component is disposed between the inner surfaces of the first and third components and the feet allow the tabletop item to be placed on a surface substantially without scratching the surface.

14. A method as recited in claim 13 wherein (a) through (c) are practiced to produce a coaster, utensil holder or ashtray, and wherein (a) is practiced by bringing the second component first face into contact with the first component inner surface.

15. A method as recited in claim 14 wherein the second component comprises a sheet of paper having a maximum thickness of about 0.25 cm; and also comprising printing a multi-colored design on at least the first face of the sheet of paper using a computer controlled printer.

16. A method as recited in claim 13 wherein each of the feet-receiving openings includes a counterbore at the inner surface of the third component; and wherein (b) is practiced by placing the feet into the openings so that the heads of the feet are disposed in the counterbores, and essentially do not protrude above the inner surface of the third component.

17. A method as recited in claim 13 wherein the first component comprises a peripheral lip, and wherein the second and third components are dimensioned to fit within the peripheral lip; and wherein (c) is practiced to push the third component into contact with the peripheral lip so as to be frictionally held thereby.

18. A method as recited in claim 13 wherein the second component is a sheet of paper having multi-color indicia on both the first and second faces thereof; and comprising the further step of disassembling the first and third components, reversing the second component, placing the second face of the second component into substantially parallel juxtaposition with the inner face of the first component, and reassembling the first and third components.

* * * * *